United States Patent
Colloff et al.

(10) Patent No.: US 8,780,902 B1
(45) Date of Patent: Jul. 15, 2014

(54) MULTIPATHING USING MULTIPLE ENDPOINT ADDRESSES FOR LOAD BALANCING IN A NETWORK

(75) Inventors: Ian G. Colloff, Los Gatos, CA (US); Gregory B. Lindahl, Mountain View, CA (US); Thomas M. Mcwilliams, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/038,290

(22) Filed: Mar. 1, 2011

Related U.S. Application Data

(63) Continuation of application No. 11/525,254, filed on Sep. 20, 2006, now Pat. No. 7,903,557.

(60) Provisional application No. 60/719,434, filed on Sep. 21, 2005.

(51) Int. Cl.
*G01R 31/08* (2006.01)
*H04L 12/28* (2006.01)
*H04J 3/24* (2006.01)

(52) U.S. Cl.
USPC ........... 370/389; 370/235; 370/237; 370/252; 370/475

(58) Field of Classification Search
None
See application file for complete search history.

(56) References Cited

U.S. PATENT DOCUMENTS

| 6,694,361 | B1 * | 2/2004 | Shah et al. | 709/222 |
|---|---|---|---|---|
| 7,421,509 | B2 * | 9/2008 | Lolayekar et al. | 709/235 |
| 7,447,153 | B2 * | 11/2008 | Klinker | 370/231 |
| 7,761,572 | B1 | 7/2010 | Auerbach | |
| 2006/0018321 | A1 * | 1/2006 | Yamada et al. | 370/392 |
| 2006/0182034 | A1 * | 8/2006 | Klinker et al. | 370/238 |
| 2008/0162839 | A1 * | 7/2008 | Nakamichi et al. | 711/159 |

OTHER PUBLICATIONS

Colloff et al., U.S. Appl. No. 11/525,254, titled as "Multipathing Using Multiple Endpoint Addresses for Load Balancing in a Network", filed Sep. 20, 2006, 35 pages.
Office Action received for U.S. Appl. No. 11/525,254, mailed on Apr. 29, 2009, 19 pages.
Office Action received for U.S. Appl. No. 11/525,254, mailed on Oct. 29, 2010, 14 pages.
Office Action received for U.S. Appl. No. 11/525,254, mailed on Nov. 10, 2009, 14 pages.
Notice of Allowance received for U.S. Appl. No. 11/525,254, mailed on Jan. 20, 2011, 7 pages.
"Infiniband TM Architecture Release 1.2.1", General Specifications, vol. 1, Chapter 3-Architectural Overview, Nov. 2007, pp. 88-142.
"Liu et al., ""Building Multirail Infiniband Clusters""", MPI-Level Designs and PerformanceEvaluation, Computer Science and Engineering, 2004, pp. 1-13."

* cited by examiner

*Primary Examiner* — Jutai Kao

(57) ABSTRACT

A method for balancing load on a network by selecting a path based on a load balancing algorithm and assigning one of several pairs of endpoint addresses for a flow based on the path selected. One pair of endpoint addresses corresponds to a first path and another pair of endpoint addresses corresponds to a second path. If the first path is selected, the first pair of endpoint addresses is assigned to the flow. If the second path is selected, the second pair of endpoint addresses is assigned to the flow. In one embodiment, based on the assigned pair of endpoint address, the flow is switched to an endpoint by the selected path.

16 Claims, 8 Drawing Sheets

| Destination Address | Port |
|---|---|
| 4, 5 | 0 |
| 6, 7 | 1 |
| 9, 11, 12, 14, 17, 19 | 2 |
| 8, 10, 13, 15, 16, 18 | 3 |

Forwarding Table 302C

| Destination Address | Port |
|---|---|
| 8, 9 | 0 |
| 10, 11 | 1 |
| 4, 6, 12, 14, 17, 19 | 2 |
| 5, 7, 13, 15, 16, 18 | 3 |

Forwarding Table 302D

| Destination Address | Port |
|---|---|
| 4, 5, 6, 7 | 0 |
| 8, 9, 10, 11 | 1 |
| 12, 13, 14, 15 | 2 |
| 16, 17, 18, 19 | 3 |

Forwarding Table 302E

| Destination Address | Port |
|---|---|
| 4, 5, 6, 7 | 0 |
| 8, 9, 10, 11 | 1 |
| 12, 13, 14, 15 | 2 |
| 16, 17, 18, 19 | 3 |

Forwarding Table 302F

| Destination Address | Port |
|---|---|
| 4, 6, 9, 11, 17, 19 | 0 |
| 5, 7, 8, 10, 16, 18 | 1 |
| 12, 13 | 2 |
| 14, 15 | 3 |

Forwarding Table 302G

| Destination Address | Port |
|---|---|
| 4, 6, 9, 11, 12, 14 | 0 |
| 5, 7, 8, 10, 13, 15 | 1 |
| 16, 17 | 2 |
| 18, 19 | 3 |

Forwarding Table 302H

Fig. 3

MULTIPATHING USING MULTIPLE ENDPOINT ADDRESSES FOR LOAD BALANCING IN A NETWORK

RELATED APPLICATIONS

This application claims priority under 35 U.S.C. §119(e) from co-pending U.S. provisional application No. 60/719,434, entitled "Multipathing Using Multiple Endpoint Addresses for Load Balancing in a Network", filed on Sep. 21, 2005 by Ian Gregory Colloff et al, which is incorporated by reference herein in its entirety.

BACKGROUND OF THE INVENTION

1. Field of the Invention

The present invention relates to network load balancing and, more specifically, to a system and method for balancing network load across multiple paths.

2. Description of the Related Art

In networking, it is generally advantageous to send traffic over multiple paths. Path diversity keeps traffic from becoming overly dependent on any one path, and increases network performance by reducing the likelihood of overloading a given path.

In conventional networks, multiple paths are often derived based on the individual load balancing techniques employed at the various switches along the path. Multiple paths are available, but the selection of a particular path may be the product of complex interactions of local decisions made by a variety of switches. However, in the interest of network efficiency, it is often desirable for network paths to be both deliberately selectable and repeatable so that paths between two endpoints can be selected by a load balancing algorithm. Therefore, what is needed is a method for switching a packet that allows for selection of one of a plurality of available paths between a pair of endpoints.

SUMMARY OF THE INVENTION

Embodiments of the present invention include a method for balancing load on a network using a load balancing algorithm to assign one of several paths to a flow of data. One pair of endpoint addresses corresponds to a first path and another pair of endpoint addresses corresponds to a second path. If the first path is selected, the first pair of endpoint addresses is assigned to the flow. If the second path is selected, the second pair of endpoint addresses is assigned to the flow. In one embodiment, based on the assigned pair of endpoint address, the flow is switched to an endpoint by the selected path.

A pair of endpoints addresses can include a source endpoint address and a destination endpoint address. In one embodiment, multiple source endpoint addresses can correspond to the same endpoint. In another embodiment, multiple destination endpoint addresses can correspond to the same endpoint.

According to various embodiments, selecting a path can be based on a variety of load balancing algorithms. In various embodiments, the load balancing algorithms can include a round robin method, a total flow analysis, an moving average endpoint data throughput method, and a moving average fabric data throughput method. In one embodiment, other load balancing algorithms are implemented.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 3 illustrates exemplary routing tables for a plurality of switches, according to one embodiment of the present invention.

DETAILED DESCRIPTION OF EMBODIMENTS

The Figures (Fig.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
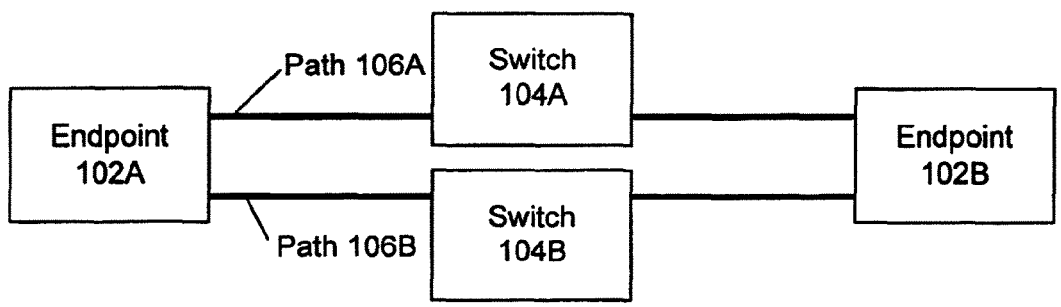
FIG. 1 illustrates multiple paths between a pair of endpoints, according to one embodiment of the present invention.

FIG. 1 illustrates multiple paths between a pair of endpoints, according to one embodiment of the present invention. The figure includes a pair of endpoints 102 A and 102B connected by a network. An endpoint 102 (such as endpoint 102A or endpoint 102B) is a logical destination on a network which is capable of sending and/or receiving data. An endpoint 102 is associated with a network address (such as an Ethernet Medium Access Control address, an Infiniband local identifier, or an Internet Protocol Address). An endpoint 102 can be implemented as a network interface, and the network interface can be included in a computer system, a server, a router, a switch, a load balancer, and so on. These examples of systems in which endpoints 102 can be included have been given for the purposes of illustration and are not limiting. Other examples of endpoints 102 will be apparent to one of ordinary skill in the art without departing from the scope of the present invention.

In one embodiment, an endpoint 102 includes a network processor and a memory. The memory is capable of storing network data (such as a flow) and instructions executable by the network processor. In one embodiment, the memory contains network data, a load balancing algorithm, and a load balancing program.

A network address can be any identifier of a logical location of a source or destination on a network. For example, a network address can be a Medium Access Control (MAC) address, a local identifier, a layer 3 address, a Fiber Channel ID, and so on. Other examples of network address will be apparent to one of skill in the art without departing from the scope of the present invention.

At least two paths 106 connect the endpoint 102A to the endpoint 102B. A path 106 (such as path 106A or path 106B) is symbolic chain of network links allowing network traffic (such as flows) to be sent from a first endpoint 102 to a second endpoint 102. A path 106 can include any number of network links, switches, routers, modems, hubs, and so on, and can pass through network equipment owned and/or operated by any number of network service providers or other entities. A path 106 includes at least one switch 104.

The path 106A can include a number of network links, switches, routers, modems, hubs, and so on that are also included in the path 106B. However, path 106A is considered distinct from path 106B because path 106A includes at least one switch (switch 104A) not included in path 106B. Similarly, path 106B is considered distinct from path 106A because path 106B includes at least one switch (switch 104B) not included in path 106A. The ability to send network traffic along a path including switch 104A but not switch 104B or along a path including switch 104B but not switch 104A is advantageous for load balancing and path diversity.

A switch 104 (such as switch 104A or switch 104B) is a network device including at least two ports. A switch 104 is configured to receive a flow on a first port and retransmit the flow on a second port. The port on which the switch 104 retransmits the flow can depend on the destination and/or source address of the flow. The switch 104 can include a forwarding table to facilitate determining the port on which a flow should be retransmitted. Several exemplary forwarding tables, according to one embodiment of the present invention, are described herein with reference to FIG. 3. The switch 104 can also perform other flow handling operations, such as routing, network address translation, bridging, and so on.

In the discussion herein, reference is made to network traffic as being comprised of flows. Embodiments of the present invention can be implemented with a variety of network technologies, and different network technologies may encapsulate network traffic in a variety of manners. The term "flows", as used herein, can apply to any component of network traffic at any layer, including, but not limited to, packets, datagrams, connections, requests, exchanges, frames, bursts, or any other segment of network data having a source and/or destination address. For example, some network technologies may implement a flow at a packet level. Other network technologies, such as InfiniBand, may implement a flow at a connection level. Within the same network technology, the level of a flow can vary depending, for example, on transport type or higher layer protocol constraints.

In the example illustrated, the endpoint 102 A is associated with at least two network addresses. A first network address is used for endpoint 102 A sending flows via path 106A, and a second network address is used for endpoint 102A sending flows via path 106B. Similarly, the endpoint 102B is associated with at least two network addresses. A third network address is used for endpoint 102B receiving flows via path 106A, and a fourth network address is used for endpoint 102B receiving flows via path 106B. The first network address and the third network address form a first pair of endpoint addresses, and are associated with network traffic from endpoint 102A to endpoint 102B on path 106A. The second network address and the fourth network address form a second pair of endpoint addresses, and are associated with network traffic from endpoint 102A to endpoint 102B on path 106B.

Advantageously, a flow can be switched along either the path 106 A or the path 106B by assigning either the first pair of endpoint addresses to the flow or the second pair of endpoint addresses to the flow. If path 106A is selected, the first pair of endpoint addresses are assigned to the flow, and the switches, routers, and links between endpoint 102A and endpoint 102B switch the flow along path 106A based on the first pair of endpoint addresses. If path 106B is selected, the second pair of endpoint addresses are assigned to the flow, and the switches, routers, and links between endpoint 102A and endpoint 102B switch the flow along path 106B based on the second pair of addresses. Advantageously, assigning a pair of endpoint addresses to a flow causes the various switches and routers between two endpoints to switch the flow along the selected path.

In one embodiment, the association of a path to a pair of endpoint addresses can depend on the direction of network traffic. For example, the first pair of endpoint addresses can be associated with path 106 A for network traffic from endpoint 102A to endpoint 102B and with path 106B for network traffic from endpoint 102B to endpoint 102 A. Similarly, the second pair of endpoint addresses can be associated with path 106B for network traffic from endpoint 102 A to endpoint 102B and with path 106A for network traffic from endpoint 102B to endpoint 102A. Therefore, assigning a pair of endpoint addresses can advantageously cause the various switches between two endpoints to switch network traffic in a first direction along a first path and network traffic in a second direction along a second path. A path can also be dedicated to a particular direction of network traffic.

Figure 2:
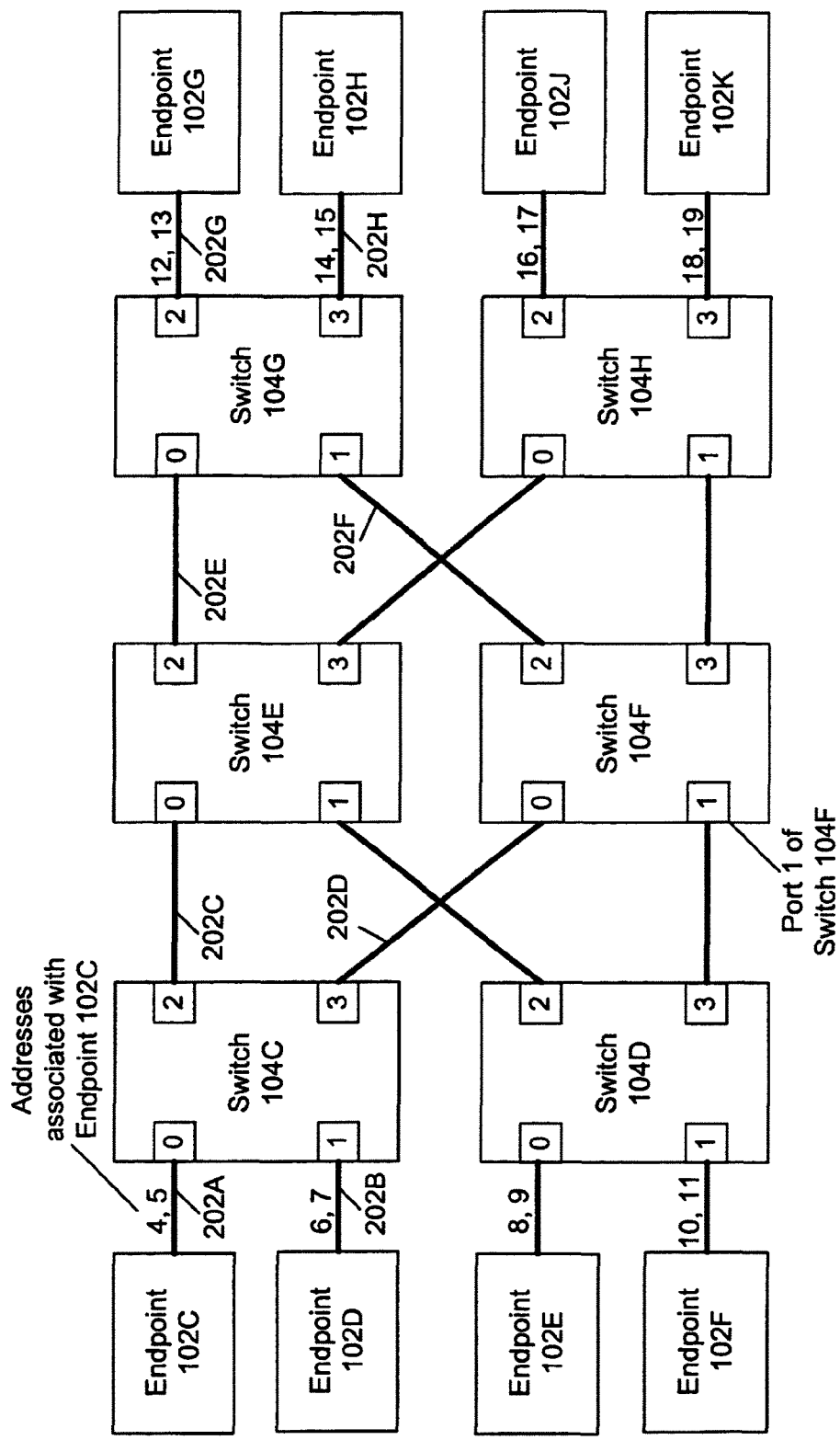
FIG. 2 illustrates a plurality of switches configured to provide multiple paths, according to one embodiment of the present invention.

FIG. 2 illustrates a plurality of switches configured to provide multiple paths, according to one embodiment of the present invention, in the example illustrated, each switch 104 (switch 104C, 104D . . . 104H) includes a plurality of logical ports—port 0, port 1, port 2, and port 3. The ports of the various switches 104 are represented as logical ports for the purposes of illustration. In some embodiments, the physical port numbers may be different than the logical port numbers. Furthermore, the layout of physical ports may be different for different switches 104, and a switch 104 may include any number of physical ports. According to various embodiments, the logical port numbers described herein (for example, on the switches 104 and in the forwarding tables 302) would be replaced by physical port numbers for the appropriate switch.

At least some of the endpoints 102 are associated with multiple endpoint addresses. For example, the endpoint 102C is associated with endpoint address 4 and endpoint address 5. The endpoint addresses illustrated in the figures and described herein are identified by simplified numbering for the purpose of illustration. Various network technologies implement network addresses using a variety of formats and techniques. An endpoint address can be implemented as any network address appropriate for the network. For example, in one embodiment, endpoint address 4 could represent an Ethernet MAC address, in another embodiment endpoint address 4 could represent an Infiniband local identifier, and in yet another embodiment address 4 could be a Fiber Channel ID for a fiber channel fabric. In one embodiment, an endpoint address can be used as either a source address or a destination address for a flow on the network.

The switches 104 are configured to provide multiple paths between certain endpoints. For example, a flow from endpoint 102C to endpoint 102G can travel along a first path including switch 104C, switch 104E, and switch 104G, or along a second path including switch 104C, switch 104F, and switch 104G. In various configurations, any number of paths is possible between two endpoints, and any number of switches can be included in a particular path.

The path on which a flow travels is based on the pair of endpoint addresses of the flow. In one embodiment, the path on which a flow travels is principally based on the destination address of the flow, in another embodiment, the path on which a flow travels is based on both the source address and the destination address of the flow.

In the example illustrated, the path on which a flow travels is principally based on the destination address of the flow, in one embodiment, a switch 104 uses a forwarding table to determine the port on which to retransmit the flow. FIG. 3 illustrates exemplary forwarding tables for a plurality of switches, according to one embodiment of the present invention. Forwarding table 302C, for example, is used by switch 104C to determine on which port to retransmit a flow based on the destination address of the flow. (Switch 104D uses forwarding table 302D, switch 104E uses forwarding table 302E, switch 104F uses forwarding table 302F, switch 104G uses forwarding table 302G, and switch 104H uses forwarding table 302H.) The example of forwarding tables is given for the purposes of illustration only and is not limiting. Other examples of techniques for determining on which port to retransmit a flow will be apparent to one of skill in the art without departing from the scope of the present invention.

In one embodiment, the forwarding tables 302 (302C, 302D ... 302H) of the various switches 104 are configured so that different pairs of endpoint addresses will result in a flow being switched along a different path. For example, if an endpoint is associated with two endpoint addresses, the forwarding tables 302 can be configured such that a flow addressed to a first pair of endpoint address will be switched along a first path and a flow addressed to a second pair of endpoint address will be switched along a second path.

A pair of endpoint addresses corresponds to a path from a first endpoint to a second endpoint. For example, suppose a flow is to be sent from endpoint 102C to endpoint 102G. Based on a load balancing algorithm, a path from endpoint 102C to endpoint 102G is selected. In the example illustrated, the load balancing algorithm can select the first path (which includes switch 104C, switch 104E, and switch 104G and links 202A, 202C, 202E, and 202G) or the second path (which includes switch 104C, switch 104F, and switch 104G and links 202A, 202D, 202F, and 202G).

If the first path is selected, the pair of endpoint addresses (4,12) is assigned to the flow. Endpoint address 4 is the source address of the flow, and endpoint address 12 is the destination address of the flow. Switch 104C receives the flow from endpoint 102C on port 0. Switch 104C retransmits the flow based on the destination address and the forwarding table 302C. Forwarding table 302C specifies that flows with destination address 12 should be retransmitted on port 2. Switch 104C retransmits the flow on port 2, and the flow is received by switch 104E on port 0. Switch 104E retransmits the flow based on the destination address and the forwarding table 302E. Forwarding table 302E specifies that flows with destination address 12 should be retransmitted on port 2. Switch 104E retransmits the flow on port 2, and the flow is received by switch 104G on port 0. Switch 104G retransmits the flow based on the destination address and the forwarding table 302G. Forwarding table 302G specifies that flows with destination address 12 should be retransmitted on port 2. Switch 104G retransmits the flow on port 2, and the flow is received by endpoint 102G. Thus, responsive to the first pair of endpoint addresses (4,12) being assigned to the flow, the flow is switched along the first path, which includes links 202A, 202C, 202E, and 202G. Endpoint 102G will typically flip the pair of endpoint addresses when forming a response flow. In the example illustrated, the response flow would have source address 12 and destination address 4. The switches 104 switch the response flow along the path corresponding to the pair of endpoint addresses (12,4).

If the second path is selected, the pair of endpoint addresses (5, 13) is assigned to the flow. Endpoint address 5 is the source address of the flow, and endpoint address 13 is the destination address of the flow. Switch 104C receives the flow from endpoint 102C on port 0. Switch 104C retransmits the flow based on the destination address and the forwarding table 302C. Forwarding table 302C specifies that flows with destination address 13 should be retransmitted on port 3. Switch 104C retransmits the flow on port 3, and the flow is received by switch 104F on port 0. Switch 104F retransmits the flow based on the destination address and the forwarding table 302F. Forwarding table 302F specifies that flows with destination address 13 should be retransmitted on port 2. Switch 104F retransmits the flow on port 2, and the flow is received by switch 104G on port 1. Switch 104G retransmits the flow based on the destination address and the forwarding table 302G. Forwarding table 302G specifies that flows with destination address 13 should be retransmitted on port 2. Switch 104G retransmits the flow on port 2, and the flow is received by endpoint 102G. Thus, responsive to the second pair of endpoint addresses being assigned to the flow, the flow is switched along the second path, which includes links 202A, 202D, 202F, and 202G. Endpoint 102G will typically flip the pair of endpoint addresses when forming a response flow. In the example illustrated, the response flow would have source address 13 and destination address 5. The switches 104 switch the response flow along the path corresponding to the pair of endpoint addresses (13,5).

In the example illustrated, the first or the second path can be advantageously selected to balance the loads of switches 104E and 104F. Assigning the first pair of endpoint addresses to a flow will switch the flow on a path that includes switch 104E, and assigning the second pair of endpoint addresses to a flow will cause the switches 104 to switch the flow on a path that includes switch 104F. Beneficially, a path can be selected through switch 104E or switch 104F in a manner that is repeatable and without need for direct control of intermediate switches or routers.

Figure 4:
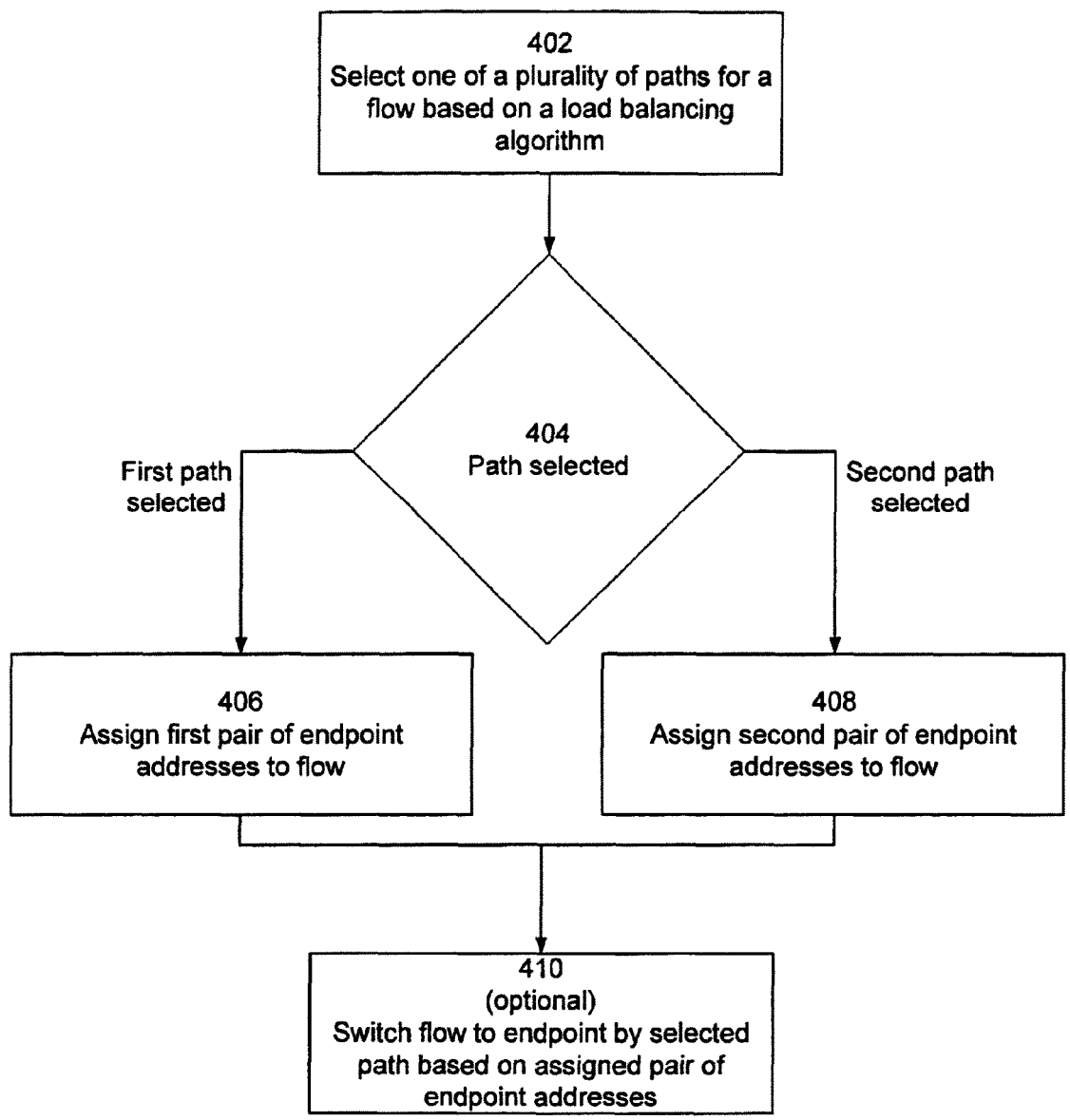
FIG. 4 illustrates a method for balancing traffic load on a network, according to one embodiment of the present invention.
Figure 5A:
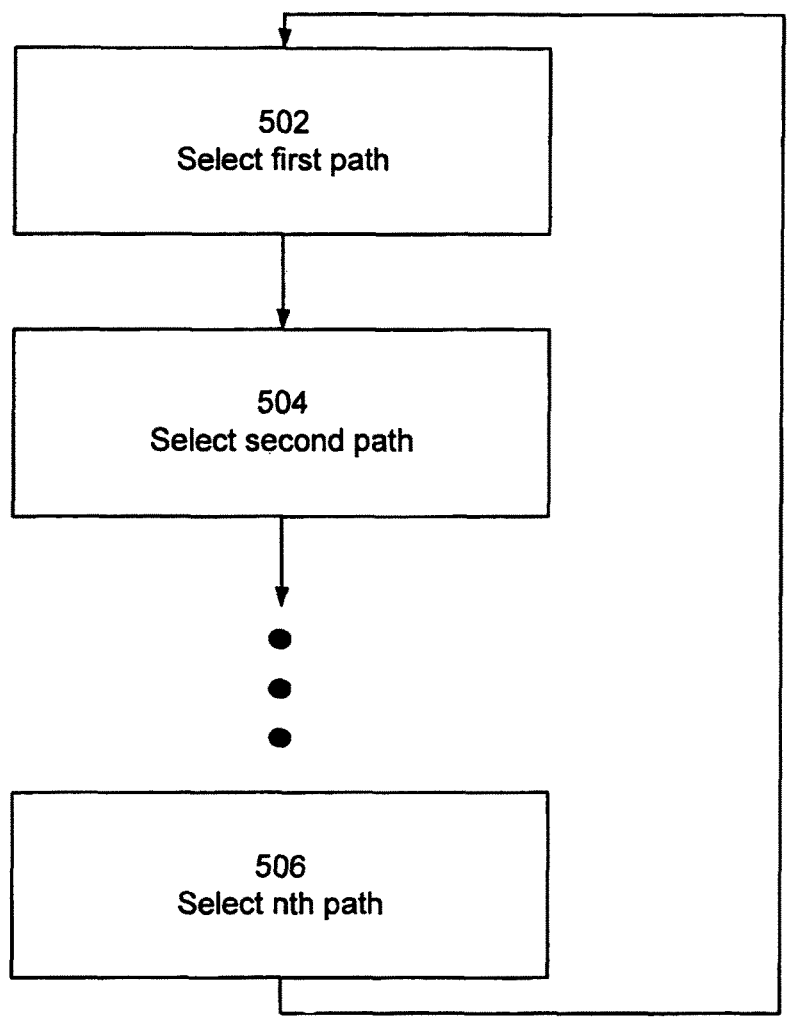
FIGS. 5(a)-5(d) illustrate methods for selecting a path, according to various embodiments of the present invention.
Figure 5B:
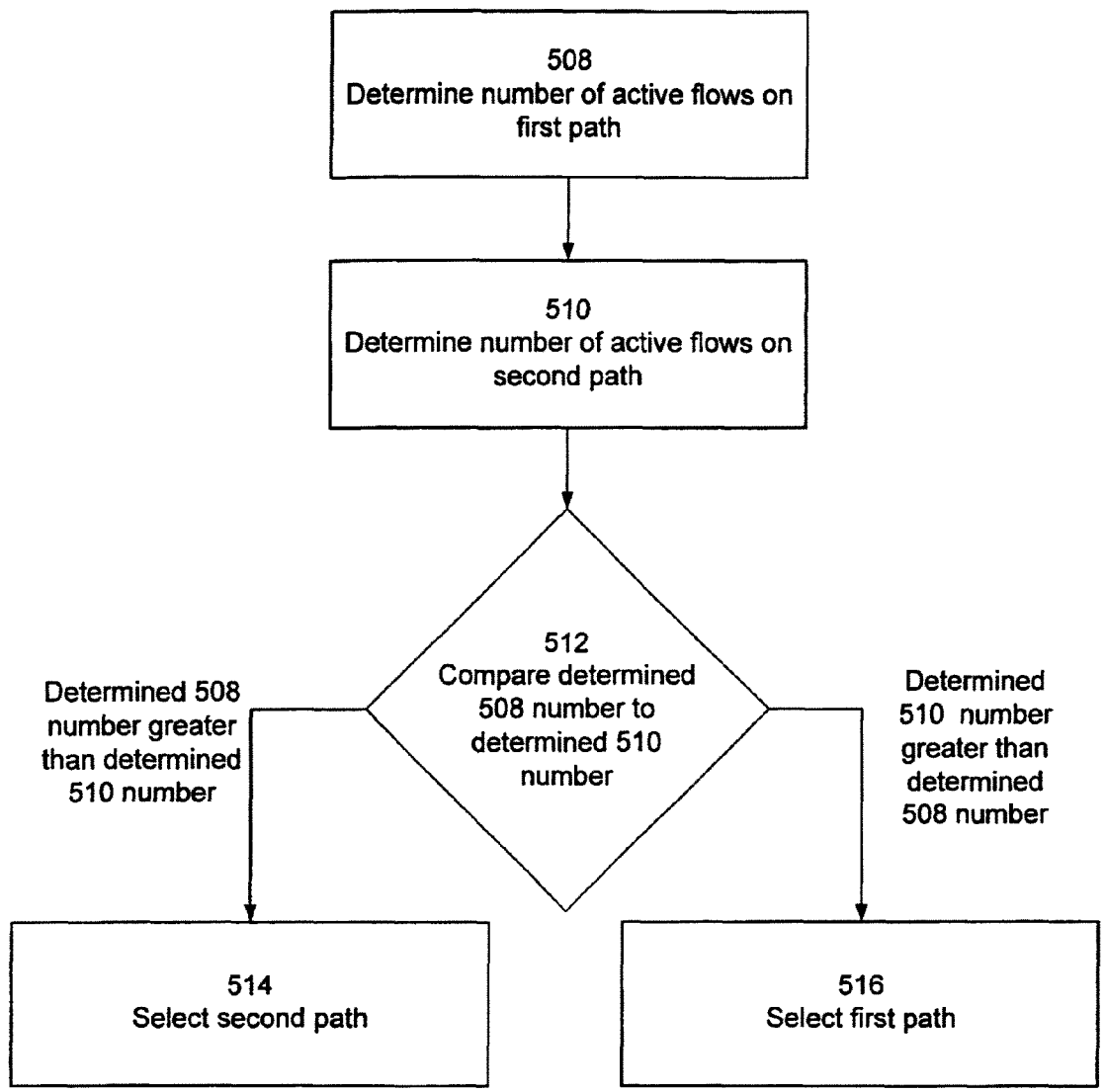
Figure 5C:
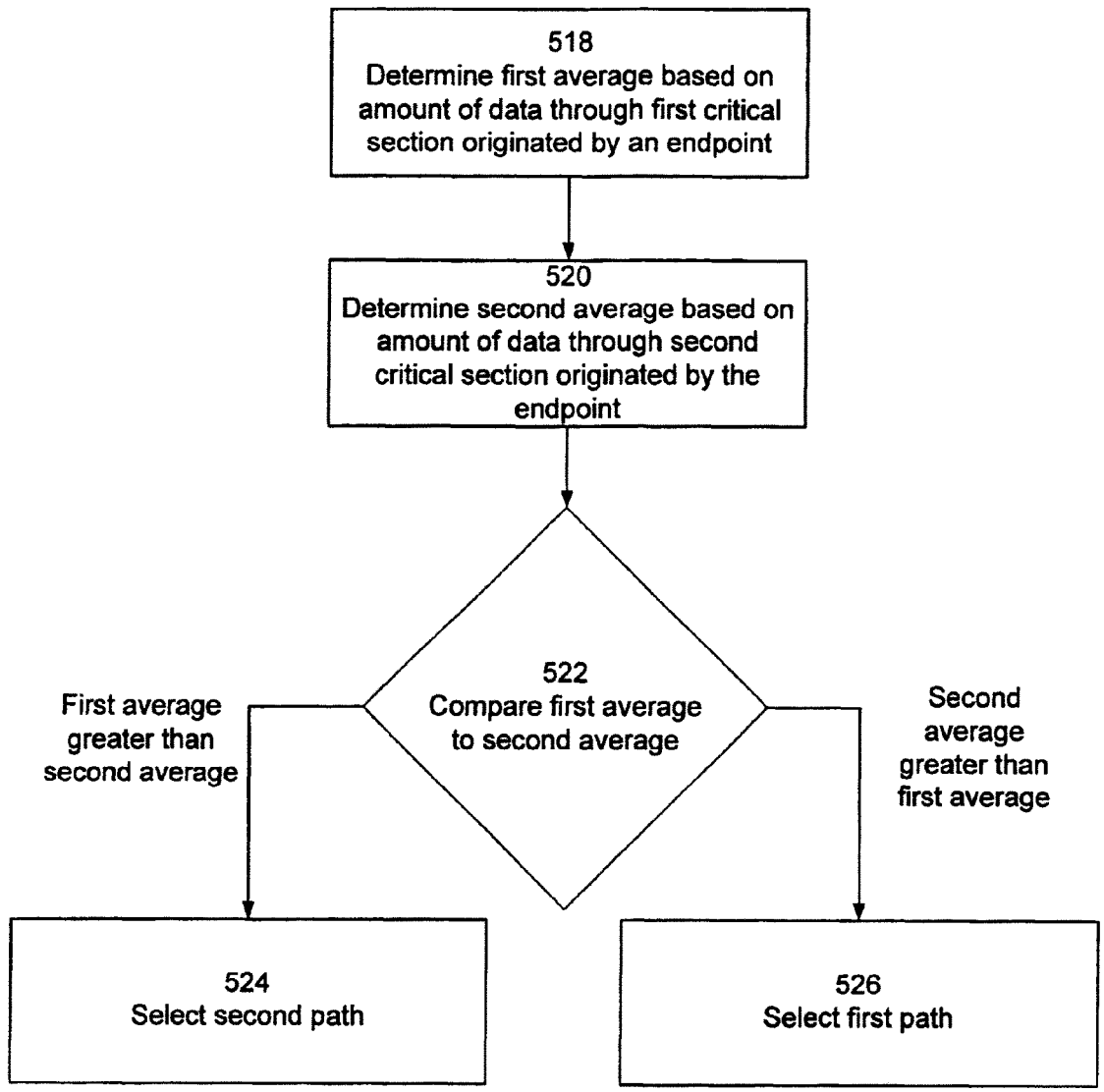
Figure 5D:
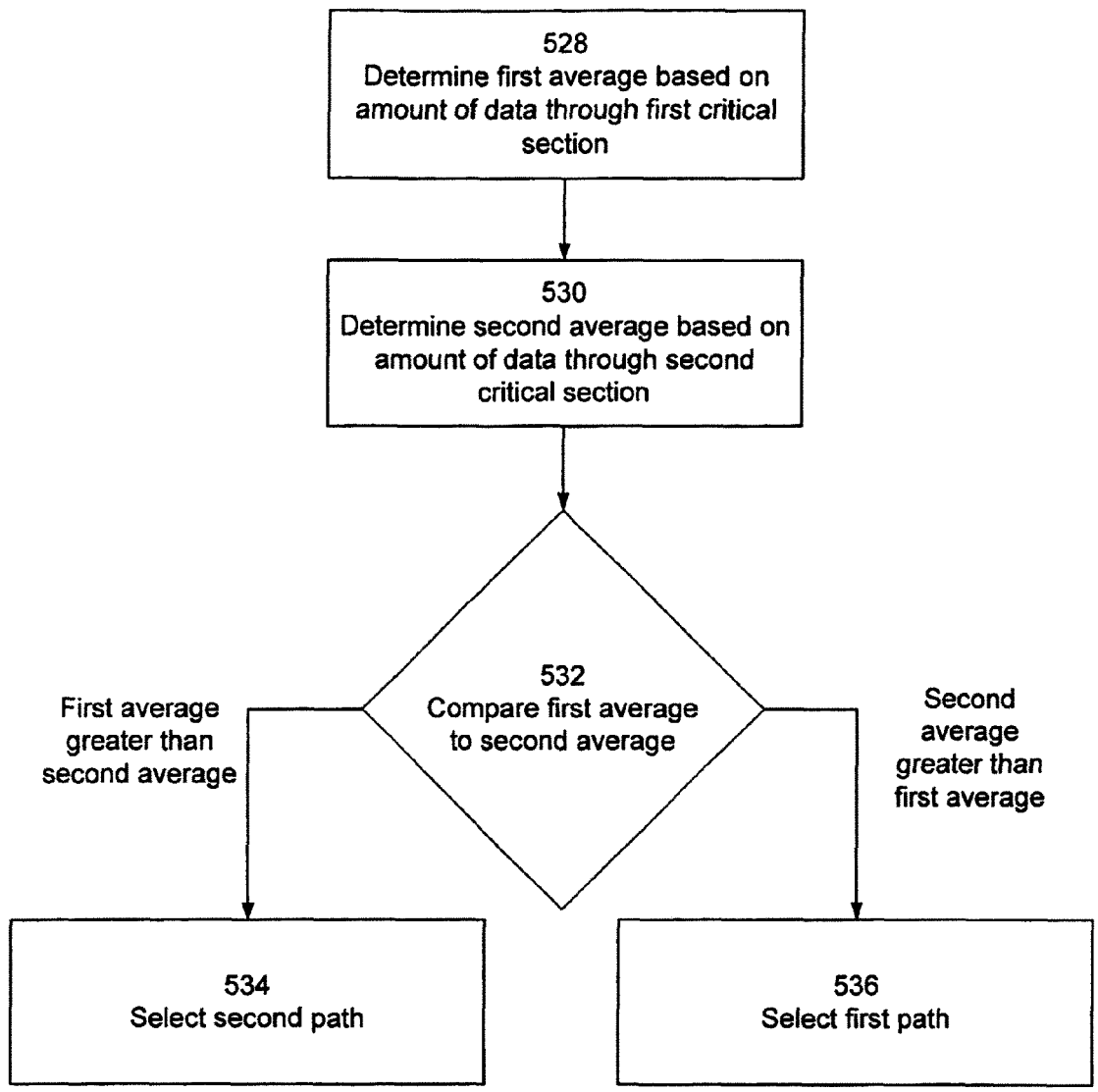

FIG. 4 illustrates a method for balancing traffic load on a network, according to one embodiment of the present invention. One of a plurality of paths for a flow is selected 402 based on a load balancing algorithm. Methods for load balancing algorithms, according to various embodiments of the present invention, are described herein with reference to FIG. 5(*a*)-5(*d*). In the example illustrated, the plurality of paths includes a first path and a second path. The first path corresponds to a first pair of endpoint addresses and includes a switch 104A. The second path corresponds to a second pair of endpoint addresses and includes a switch 104B.

Based 404 on the path selected, the first pair of endpoint addresses or the second pair of endpoint addresses is assigned to the flow. If the first path is selected 402, the first pair of endpoint addresses is assigned 406 to the flow. If the second path is selected 402, the second pair of endpoint addresses is assigned 408 to the flow.

Optionally, the flow is switched 410 to an endpoint by the selected path based on the assigned pair of endpoint addresses. For example, if the first path is selected 402, the flow is switched 410 by the first path to the endpoint based on the first pair of endpoint addresses. As another example, if the second path is selected 402, the flow is switched 410 by the second path to the endpoint based on the second pair of endpoint addresses.

In one embodiment, the method illustrated in FIG. 4 is performed at a switch 104. For example, the switch 104H can be implemented as a router. Responsive to receiving a flow from endpoint 102J, the switch 104H selects 402 a path based on a load balancing algorithm. In one embodiment, the switch 104H also assigns 406/408 a pair of endpoint addresses based on the selected path. The switches 104 switch 410 the flow along the path corresponding to the assigned pair of endpoint addresses.

In another embodiment, the method illustrated in FIG. 4 is performed at an endpoint 102 (or by a system in which the endpoint 102 is included). For example, an endpoint 102J, having a flow to send, selects 402 a path based on a load balancing algorithm and assigns 406/408 a pair of endpoint addresses to the flow based on the selected path. The endpoint 102J sends the flow to the switch 104H, and the switches 104 switch 410 the flow along the path corresponding to the assigned pair of endpoint addresses. In yet another embodiment, the method is performed at another device (not shown) connected to the endpoint 102.

In one embodiment, a path is selected based on a load balancing algorithm. A load balancing algorithm can be understood as a method for distributing network traffic over a plurality of critical sections. A critical section is a network resource, such as a switch or a link, that may be shared by multiple paths. In the example illustrated in FIG. 2, switch 104E and switch 104F are critical sections. A load balancing algorithm assists with path selection by determining through which critical section a particular component of network traffic should be carried. According to various embodiments, a path can be selected in response to a variety of events. For example, a path can be selected at periodic time intervals, in response to a request for a new connection, in response to receipt of a flow, and so on. Other examples of events at which a path can be selected will be apparent to one of skill in the art without departing from the scope of the present invention.

FIGS. 5(*a*)-5(*d*) illustrate methods for selecting a path, according to various embodiments of the present invention. In one embodiment, a round robin method is used as a load balancing algorithm, in the round robin method, paths are selected in a rotating fashion. For example, in a case of two available paths, in response to a first flow request, the first path is selected. In response to a second flow request, the second path is selected. In response to a third flow request, the first path is selected again, and so on. For the purposes of illustration, an example of two available paths has been described, but the round robin method can be applied to path selection with any number of available paths.

FIG. 5(*a*) illustrates a round robin method, according to one embodiment of the present invention. A first path is selected 502. Subsequently, a second path is selected 504. The next path is selected and so on for all the n available paths until the nth path is selected 506. After the nth path is selected 506, the first path is again selected 502. By rotating (or, in the case of two available paths, alternating) the selection of paths, the number of connections and/or flows through a critical section typically averages advantageously to a level close to that of other critical sections.

In another embodiment, a total flow analysis is used as a load balancing algorithm. In the total flow analysis, paths are selected based on the number of flows (such as connections) active through the various critical sections between two endpoints. The path having the fewest number of active flows is selected. For example, if switch 104E has 5 active flows through it and switch 104F has 3 active flows through it, the total connection analysis selects a path including switch 104F. For the purposes of illustration, an example of two available paths has been described, but the total connections analysis can be applied to path selection with any number of available paths.

FIG. 5(*b*) illustrates a method of total flow analysis, according to one embodiment of the present invention. The number of active flows on a first path is determined 508. The number of active flows on a second path is determined 510. The number of active flows on the first path is compared 512 to the number of active flows on the second path. If the number of active flows on the first path is greater than the number of active flows on the second path, the second path is selected 514. If the number of active flows on the second path is greater than the number of active flows on the first path, the first path is selected 516. By selecting the path having the fewest active flows, the number of flows active through a critical section can advantageously be kept at a level close to that of other critical sections.

In still another embodiment, a moving average endpoint data throughput method is used as a load balancing algorithm. In the moving average endpoint data throughput method, paths are selected based on a moving average of the amount of data originated by a particular endpoint passing through the various critical sections. The path that is selected includes the critical section (or critical sections) having the least average amount of data originated by a particular endpoint passing through that critical section. For example, if the paths going through switch 104E have an average of 50 units of data originated from endpoint 102D passing through it per second and the paths going through switch 104F have an average of 85 units of data originated from endpoint 102D passing through it per second, the moving average data throughput method selects a path including switch 104E. For the purposes of illustration, an example of two available paths has been described, but the moving average data throughput method can be applied to path selection with any number of available paths.

FIG. 5(*c*) illustrates a moving average endpoint data throughput method, according to one embodiment of the present invention. A first average is determined 518 based on the amount of data originated by an endpoint and passing through a first critical section. A second average is determined 520 based on the amount of data originated by the endpoint and passing through a second critical section. The first average is compared 522 to the second average. If the first average is greater than the second average, the second path is selected 524. If the second average is greater than the first average, the first path is selected 526. By selecting the path including the critical section having the least average amount of data originated by a particular endpoint passing through it, the average amount of data originated by a particular endpoint and passing through a critical section can advantageously be kept at a level close to that of other critical sections.

In one embodiment, bands of endpoint addresses are indexed to critical sections. For example, a first set of addresses can index to a first critical section and a second set of addresses can index to a second critical section. For example, an endpoint can estimate a moving average of data passing through the first critical section by measuring the amount of data associated with addresses included in the first set of addresses. Similarly, the endpoint can estimate of a moving average of data passing through the second critical section by measuring the amount of data associated with addresses included in the second set of addresses. Advantageously, an endpoint can estimate a moving average of data passing through a critical section without specific knowledge or understanding of the network topology, thereby facilitating simplified and efficient load balancing.

In still another embodiment, a moving average fabric data throughput method is used as a load balancing algorithm. In the moving average fabric data throughput method, paths are selected based on a moving average of the amount of data passing through the various critical sections. The average amount of data can include data originated from a variety of endpoints. The path that is selected includes the critical section (or critical sections) having the least average amount of data passing through that critical section. For example, if switch 104E has an average of 120 units of data passing through it per second and switch 104F has an average of 130 units of data passing through it per second, the moving average data throughput method selects a path including switch 104E. For the purposes of illustration, an example of two available paths has been described, but the moving average fabric data throughput method can be applied to path selection with any number of available paths.

FIG. 5(*d*) illustrates a moving average fabric data throughput method, according to one embodiment of the present invention. A first average is determined 528 based on the amount of data passing through a first critical section. A second average is determined 530 based on the amount of data passing through a second critical section. The first average is compared 532 to the second average. If the first average is greater than the second average, the second path is selected 534. If the second average is greater than the first average, the first path is selected 536. By selecting the path including the critical section having the least average amount of data passing through it, the average amount of data passing through a critical section can advantageously be kept at a level close to that of other critical sections.

The specific load balancing algorithms described herein have been given as examples of algorithms that can be employed according to various embodiments of the present invention, in one embodiment, various other load balancing algorithms can be implemented to select path. Further examples of load balancing algorithms will be apparent to one of skill in the art without departing from the scope of the present invention.

In one embodiment, the first path includes a switch that is not included in the second path. In another embodiment, all of the switches included in the first path are also included in the second path. Furthermore, in one embodiment, the first and the second paths may include an identical set of links, switches, routers and so on between a first endpoint and a second endpoint.

For the purposes of illustration, various of embodiments of the present invention have been described relating to the transmission of a flow from a first endpoint to a second endpoint. This example has been chosen for its clarity and is not limiting. One of skill in the art will recognize that embodiments of the present invention can be implemented for delivery of flows sent by broadcast, multicast, and so on, without departing from the scope of the present invention.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method comprising:
   selecting, by a first endpoint, one of a plurality of paths to a second endpoint for a flow based on a load balancing algorithm, the paths including at least a first path and a second path, the first path corresponding to a first pair of Infiniband local identifier endpoint addresses and including a first switch, and the second path corresponding to a second pair of Infiniband local identifier endpoint addresses and including a second switch, wherein a first destination Infiniband local identifier in the first pair of Infiniband local identifiers and a second destination Infiniband local identifier in the second pair of Infiniband local identifiers identify the second endpoint, and wherein the first destination Infiniband local identifier and the second destination Infiniband local identifier are not identical, wherein a first source Infiniband local identifier in the first pair of Infiniband local identifiers and a second source Infiniband local identifier in the second pair of Infiniband local identifiers identify the first endpoint, and wherein the first source Infiniband local identifier and the second source Infiniband local identifier are not identical, and wherein the load balancing algorithm comprises a load balancing algorithm that operates on performance data of the first switch and on performance data of the second switch;
   assigning, by the first endpoint, the first pair of Infiniband local identifier endpoint addresses to the flow if the first path is selected; and
   assigning, by the first endpoint, the second pair of Infiniband local identifier endpoint addresses to the flow if the second path is selected.

2. The method of claim 1, wherein the second path does not include the first switch.

3. The method of claim 1, further comprising:
   based on the assigned pair of Infiniband local identifier endpoint addresses, switching the flow to an endpoint by the selected path.

4. The method of claim 1, wherein selecting the path comprises alternating selection of the first path and of the second path.

5. The method of claim 1, wherein selecting the path comprises:
   determining a number of active flows through the first path;
   determining a number of active flows through the second path;
   if the number of active flows through the first path is larger than the number of active flows through the second path, selecting the second path; and
   if the number of active flows through the second path is larger than the number of active flows through the first path, selecting the first path.

6. The method of claim 1, wherein selecting the path comprises:
   determining a first average based on an amount of data originated by an endpoint and passing through a first critical section, the first path includes the first critical section;
   determining a second average based on an amount of data originated by the endpoint and passing through a second critical section, the second path includes the second critical section; if the first average is larger than the second average, selecting the second path; and if the second average is larger than the first average, selecting the first path.

7. The method of claim 1, wherein selecting the path comprises:
 determining a first average based on an amount of data passing through a first critical section, the first path includes the first critical section;
 determining a second average based on an amount of data passing through a second critical section, the second path includes the second critical section;
 if the first average is larger than the second average, selecting the second path; and
 if the second average is larger than the first average, selecting the first path.

8. A system for balancing traffic load on a network, the system comprising:
 an endpoint, including:
  a processor; and
  a memory, the memory containing a flow, a load balancing algorithm, and a load balancing program for selecting one of a plurality of paths to a second endpoint based upon the load balancing algorithm, the paths including at least a first path and a second path, the first path corresponding to a first pair of Infiniband local identifier endpoint addresses and including a first switch, and the second path corresponding to a second pair of Infiniband local identifier endpoint addresses and including a second switch, wherein the load balancing program assigns the first pair of Infiniband local identifier endpoint addresses to the flow if the first path is selected and assigns the second pair of Infiniband local identifier endpoint addresses to the flow if the second path is selected, wherein a first destination Infiniband local identifier in the first pair of Infiniband local identifiers and a second destination Infiniband local identifier in the second pair of Infiniband local identifiers identify the second endpoint, and wherein the first destination Infiniband local identifier and the second destination Infiniband local identifier are not identical, wherein a first source Infiniband local identifier in the first pair of Infiniband local identifiers and a second source Infiniband local identifier in the second pair of Infiniband local identifiers identify the first endpoint, and wherein the first source Infiniband local identifier and the second source Infiniband local identifier are not identical, and wherein the load balancing algorithm comprises a load balancing algorithm that operates on performance data of the first switch and on performance data of the second switch.

9. The system of claim 8, wherein the second path does not include the first switch.

10. The system of claim 8, wherein the memory further contains a forwarding table configured to switch the flow towards an endpoint by the selected path based on the assigned pair of endpoint addresses.

11. The system of claim 8, wherein the load balancing algorithm is configured to alternate selection of the first path and of the second path.

12. The system of claim 8, wherein the load balancing algorithm is configured to:
 determine a number of active flows through the first path;
 determine a number of active flows through the second path;
 if the number of active flows through the first path is larger than the number of active flows through the second path, select the second path; and
 if the number of active flows through the second path is larger than the number of active flows through the first path, select the first path.

13. The system of claim 8, wherein the load balancing algorithm is configured to:
 determine a first average based on an amount of data originated by an endpoint and passing through a first critical section, the first path includes the first critical section;
 determine a second average based on an amount of data originated by the endpoint and passing through a second critical section, the second path includes the second critical section;
 if the first average is larger than the second average, select the second path; and
 if the second average is larger than the first average, select the first path.

14. The system of claim 8, wherein the load balancing algorithm is configured to:
 determine a first average based on an amount of data passing through a first critical section, the first path includes the first critical section;
 determine a second average based on an amount of data passing through a second critical section, the second path includes the second critical section; if the first average is larger than the second average, select the second path; and if the second average is larger than the first average, select the first path.

15. A computer program product for balancing traffic load on a network, the computer program product stored on a non-transitory computer-readable medium containing computer program code for:
 selecting one of a plurality of paths for a flow based a load balancing algorithm, the paths including at least a first path and a second path, the first path corresponding to a first pair of Infiniband local identifier endpoint addresses and including a first switch, and the second path corresponding to a second pair of Infiniband local identifier endpoint addresses and including a second switch, wherein a first destination Infiniband local identifier in the first pair of Infiniband local identifiers and a second destination Infiniband local identifier in the second pair of Infiniband local identifiers identify the second endpoint, and wherein the first destination Infiniband local identifier and the second destination Infiniband local identifier are not identical, wherein a first source Infiniband local identifier in the first pair of Infiniband local identifiers and a second source Infiniband local identifier in the second pair of Infiniband local identifiers identify the first endpoint, and wherein the first source Infiniband local identifier and the second source Infiniband local identifier are not identical, and wherein the load balancing algorithm comprises a load balancing algorithm that operates on performance data of the first switch and on performance data of the second switch;
 assigning the first pair of Infiniband local identifier endpoint addresses to the flow if the first path is selected; and
 assigning the second pair of Infiniband local identifier endpoint addresses to the flow if the second path is selected.

16. The computer program product of claim 15, wherein the computer readable medium further contains computer code for:

based on the assigned pair of Infiniband local identifier endpoint addresses, switching the flow to an endpoint by the selected path.

* * * * *